United States Patent

Campbell et al.

[15] 3,687,262
[45] Aug. 29, 1972

[54] ARTICLE HANDLING APPARATUS

[72] Inventors: Lyman L. Campbell, 26 E. Circle Drive, East Longmeadow, Mass. 01106; Constantine W. Kulig, 51 Mayflower Road, Windsor, Conn. 06095

[22] Filed: May 24, 1971

[21] Appl. No.: 146,420

Related U.S. Application Data

[63] Continuation of Ser. No. 31,297, April 23, 1970, abandoned.

[52] U.S. Cl. .............................. 198/31 AA, 198/24
[51] Int. Cl. ....................... B65g 47/26, B65g 47/00
[58] Field of Search ..................... 198/31 AA, 24, 20

[56] References Cited

UNITED STATES PATENTS

| | | | |
|---|---|---|---|
| 2,807,390 | 9/1957 | Bonebrake | 198/24 |
| 3,040,867 | 6/1962 | Posten | 198/31 AA |
| 3,184,031 | 5/1965 | Dunlap | 198/31 AA |
| 3,277,994 | 10/1966 | Giueti | 198/31 AA |

*Primary Examiner*—Richard E. Aegerter
*Attorney*—McCormick, Paulding & Huber

[57] ABSTRACT

Newly formed articles of glassware are continuously fed single file and in longitudinally spaced relationship on a conveyor, and groups of them are pushed diagonally toward one edge of the conveyor, and thence laterally across a deadplate onto a wider lehr conveyor, by a horizontally extending pusher bar which is pendulously mounted on a pair of depending parallel arms. The arms are pivotally mounted on a reciprocable carriage, and as so supported the pusher bar swings through an arc during forward movement of the carriage. In spite of being pendulously supported on these arms the pusher bar is restrained to movement in a horizontal plane during forward movement of the carriage by providing a non-linear carriage track, so shaped as to raise and lower the pivotally mounted arms as the pusher bar swings through its arc. Each arm has a spur gear which meshes with a rack gear slidably mounted in the carriage for movement of a cross-slide perpendicularly with respect to the forward direction of movement of the carriage. A cam follower is connected to the rack gear and engages a fixed cam to move the rack gear in timed relationship with forward movement of the carriage to achieve the diagonal motion of the pusher bar. An air motor is used as an air spring to urge the cam follower into an active position in engagement with the fixed cam, and said motor is also sued to move the cam follower from its engaged position to a disengaged position thereby sliding the rack gear through a substantial angle so as to raise the pusher bar during return movement of the carriage.

20 Claims, 3 Drawing Figures

INVENTOR.
LYMAN L. CAMPBELL
CONSTANTINE W. KULIG

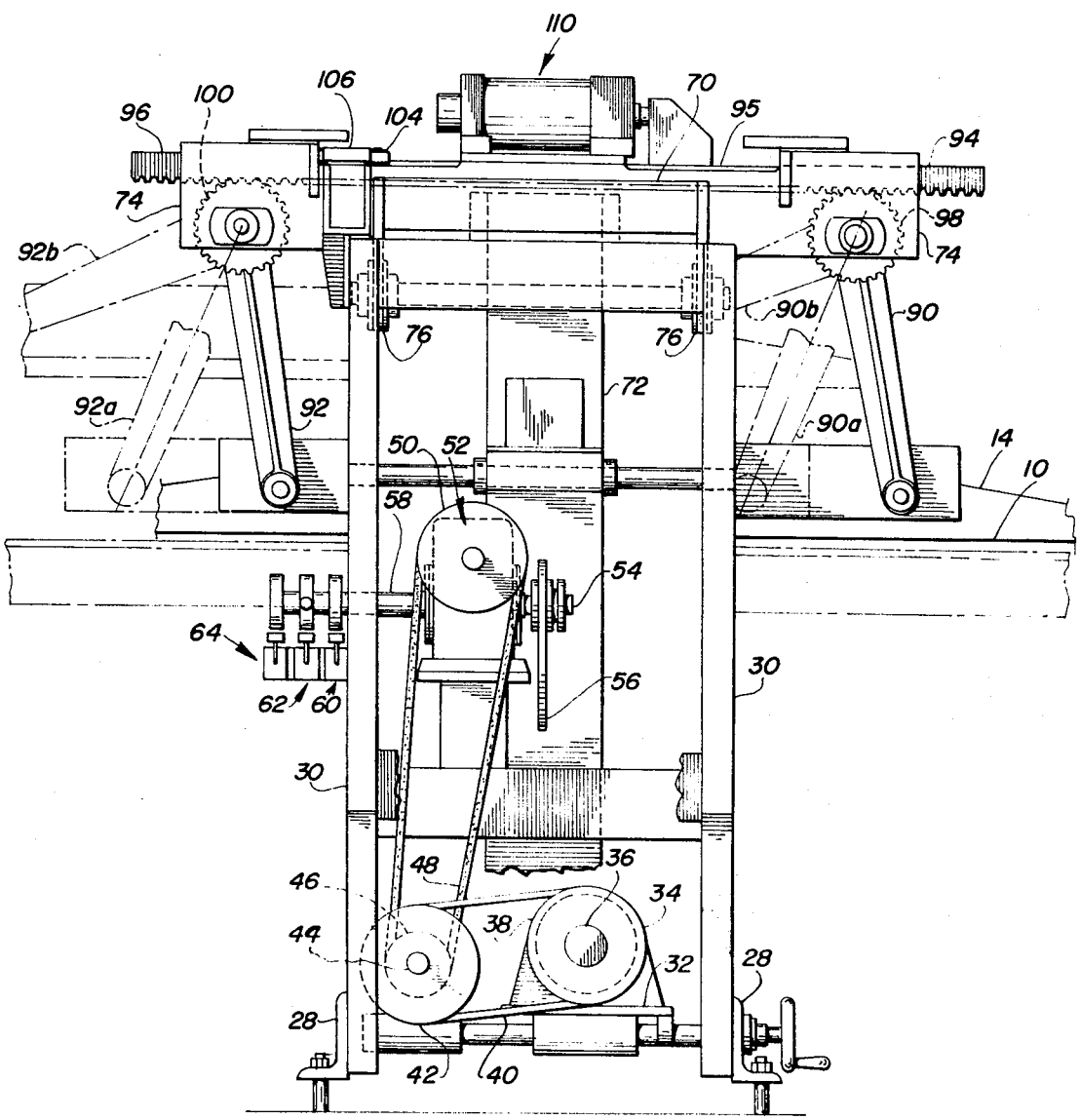

ARTICLE HANDLING APPARATUS

CROSS-REFERENCE TO RELATED APPLICATIONS

This application is a continuation of application Ser. No. 31,297 entitled ARTICLE HANDLING APPARATUS, filed Apr. 23, 1970, now abandoned; which application being in the names of LYMAN L. CAMPBELL and CONSTANTINE W. KULIG.

BACKGROUND OF THE INVENTION

In a typical glassware plant newly formed articles are conventionally advanced single file and in spaced longitudinal relationship on a narrow conveyor for single line delivery toward a glassware annealing lehr. The lehr includes a relatively wide continuously operated conveyor moving at a much slower speed than the single line conveyor and is able to accommodate groups of articles in successive rows. In order to move the continuously fed glassware articles off the narrow conveyor onto the wider lehr conveyor a pusher bar is usually provided for pushing a group of articles, of predetermined number, generally laterally off the relatively narrow infeed conveyor and across a deadplate onto the upstream end of the wider lehr conveyor.

A typical prior art design for accomplishing the foregoing purpose is disclosed in U. S. Pat. No. 3,040,867 issued to Posten, et al on June 26, 1962. As disclosed therein, means is provided for moving the pusher bar generally normally with respect to the direction of movement of the narrow infeed conveyor, until the articles are engaged by the bar, at which time the bar is moved diagonally so that the bar clears the next following article on the infeed conveyor. The path of movement of the bar is then once more normal with respect to the direction of the infeed conveyor so as to push the articles across the deadplate in the direction of movement of the lehr conveyor. In accordance with the present invention, means is provided for initially moving the pusher bar diagonally with a velocity component equal to the speed of movement of the articles on the conveyor so that the bar moves into engagement with the articles on the same diagonal path used to push them across the conveyor. As the articles are being pushed in this manner toward the edge of the infeed conveyor, but prior to crossing over onto the deadplate, the pusher bar of the present invention assumes a path normal to the direction of movement of the infeed conveyor. This particular path of movement for a pusher bar has been found to be more satisfactory when the infeed conveyor is operated at higher rates of speed characteristic of present day glassware forming machines.

Another prior art apparatus of this general type is disclosed in U.S. Pat. No. 3,184,031 issued to Dunlap on May 18, 1965. As disclosed therein a pusher bar is provided with means for moving it generally diagonally and along an apparently continuously curving path across the infeed conveyor, across the deadplate, and across the upstream end of the lehr conveyor. In accordance with the present invention on the other hand, the pusher bar is moved diagonally prior to engagement with the articles and continues its diagonal movement until reaching a point just short of the edge of the infeed conveyor at which time the pusher bar assumes a path normal to the direction of movement of the articles on said infeed conveyor so as to urge them laterally across the deadplate in the direction of the lehr conveyor. Further, as a result of the substantially linear motion of the pusher bar in the present invention, the component of velocity of the pusher bar in the direction of movement of the infeed conveyor can be matched quite close to that of the articles on the infeed conveyor especially just prior to engagement therewith and for at least a portion of the pusher bar's path over the infeed conveyor. That is, only when the articles have been captured by the notches in the pusher bar does the pusher bar assume a path normal to the direction of movement of the articles on the infeed conveyor.

A more specific object of the present invention is to provide a mechanism for moving a pusher bar in an apparatus of the type described hereinabove, which mechanism is so constructed and arranged that the pusher bar path of movement in the forward direction is diagonally oriented with respect to the path of movement of the articles on the infeed conveyor, with a component of velocity in the direction of the infeed conveyor equal to that of said articles and a relatively small initial component in the forward direction to minimize the impact of the pusher bar with the articles. During the pusher bar return movement, that is when the pusher bar is returning to its initial position prior to making another pass at a group of articles on the infeed conveyor, the pusher bar initially moves rearwardly to clear the articles on the lehr conveyor, and then and only then does it move upwardly thereby positively avoiding contact with the articles deposited on the lehr conveyor. In this raised configuration, return movement of the pusher bar is continued well clear of articles on the infeed conveyor. It is a feature of the present invention that the pusher bar during return movement follows a path which need not be the reverse of that followed during forward movement thereof.

SUMMARY OF THE INVENTION

This invention relates generally to apparatus for transferring articles such as glassware articles from a single line conveyor onto a wider lehr conveyor where the articles are advanced row on row through a lehr. More particularly, the present apparatus includes an elongated pusher bar with notches or the like for engaging a group of spaced articles on an infeed conveyor, a pair of pendulously supported parallel arms for the pusher bar, a reciprocable carriage for pivotally supporting the arms while the carriage is moved in a lateral direction across the path of movement of the articles on the infeed conveyor, and means for synchronizing movement of these arms in timed relationship with forward movement of the carriage so that the pusher bar follows a diagonal path during the active portion of its cycle across a major portion of the infeed conveyor, and so that it follows a normal path of movement across the deadplate to deposit the articles on the lehr conveyor in a row.

BRIEF DESCRIPTION OF THE DRAWINGS

FIG. 3 is an end view of the apparatus shown in FIG. 1 and 2, with the pusher bar supporting arms in their initial position in phantom lines, and in their forward or delivery positions over the lehr conveyor in full lines. The disengaged or raised positions of these arms for return movement of the pusher bar are also shown in phantom lines.

DETAILED DESCRIPTION

Figure 1:
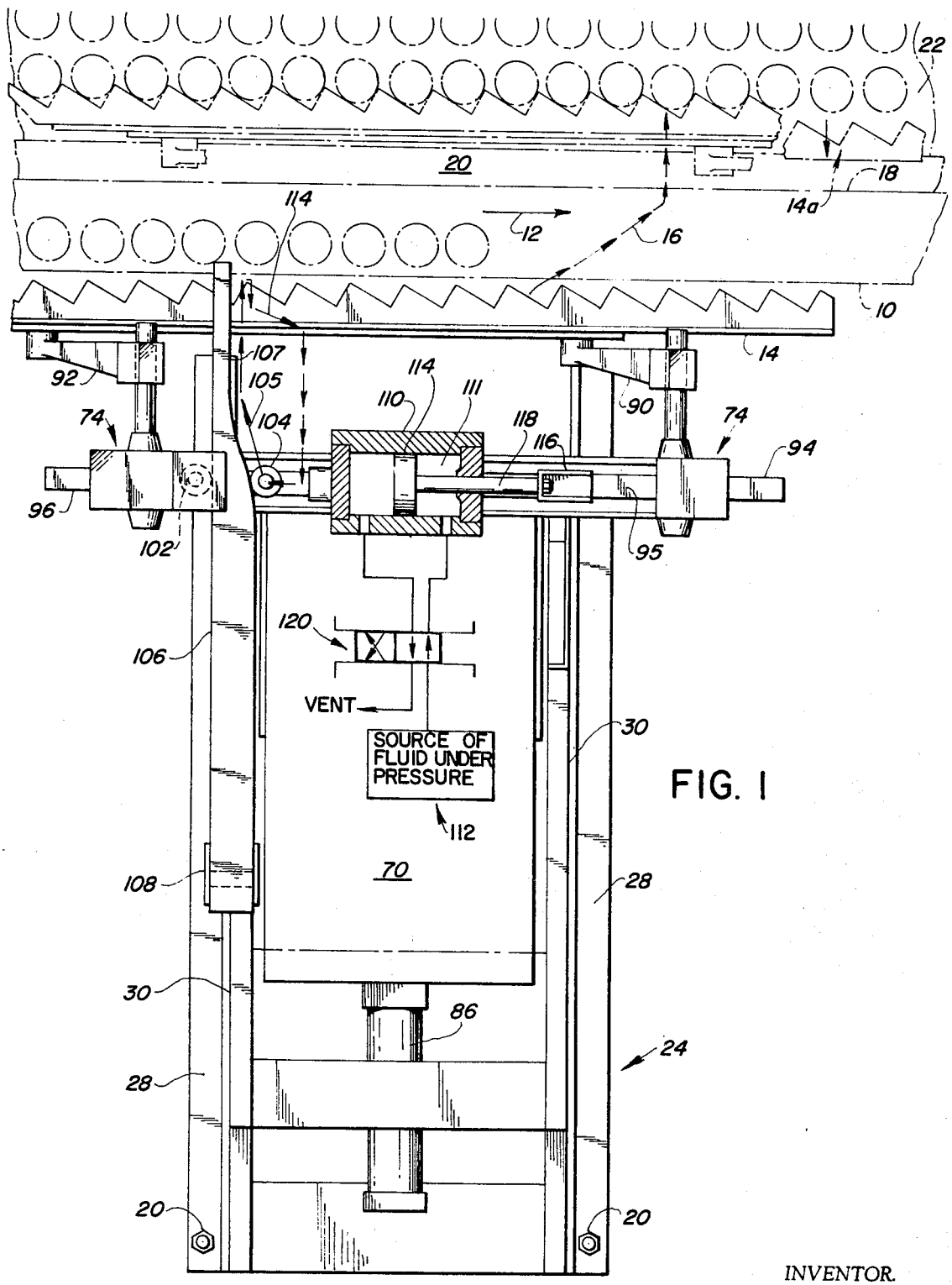
FIG. 1 is a plan view of an apparatus constructed in accordance with the present invention, and shows the forward path of movement of the pusher bar. This view also shows a portion of its return path with its initial and its forward limit positions, and an intermediate position taken during the return motion, indicated in phantom lines.
Figure 2:
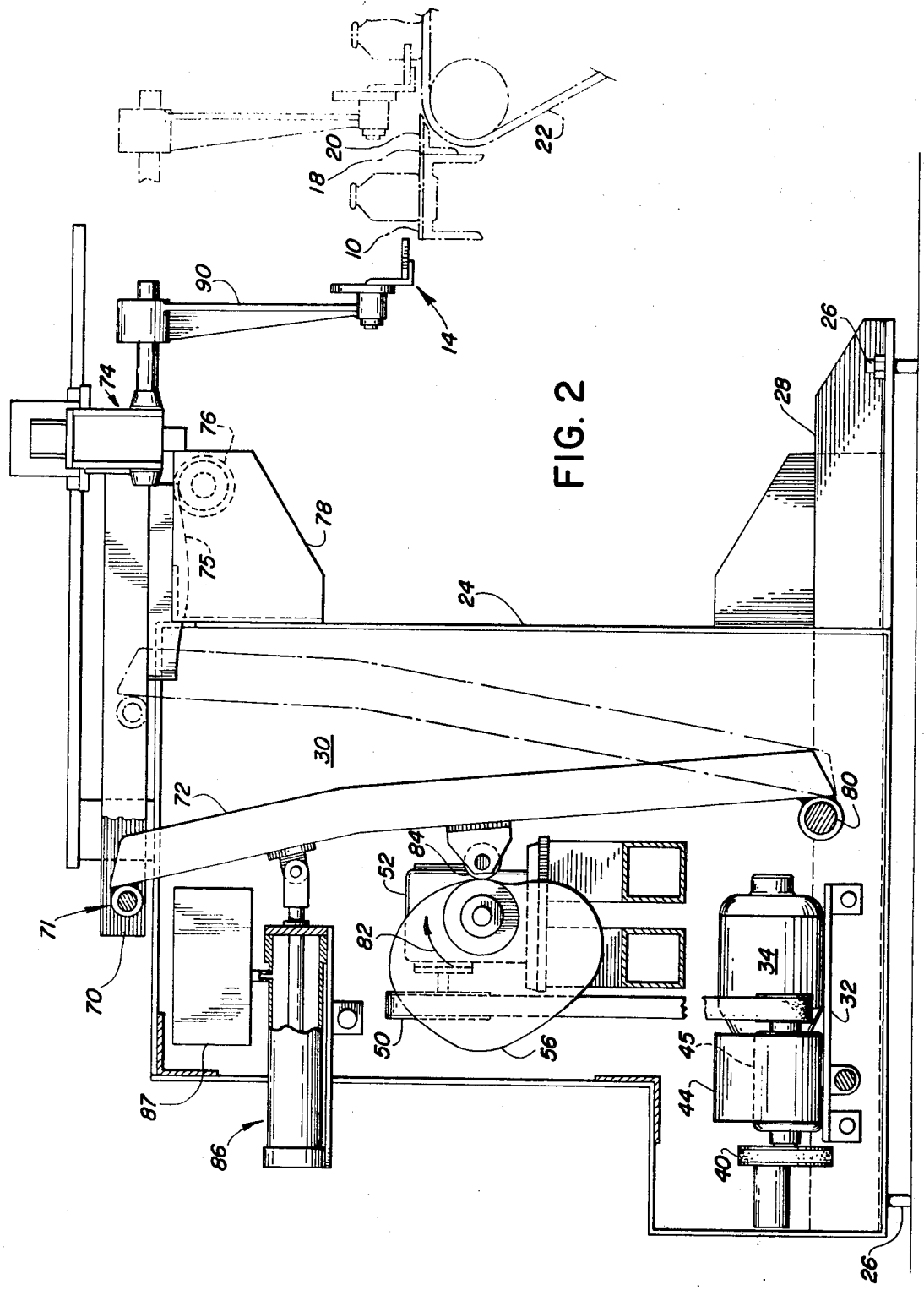
FIG. 2 is a side elevational view partly in vertical section of the apparatus shown in FIG. 1, showing the pusher bar at its initial and forward positions in full and in phantom lines respectively.

Turning now to the drawings in greater detail, FIG. 1 shows an infeed conveyor 10 of the type which is adapted to convey articles single file in the direction of the arrow 12 from a glassware forming machine or the like. Means is provided for moving the pusher bar 14 generally diagonally across the infeed conveyor 10, as indicated by the series of arrows 16, and thence laterally off the edge 18 of the infeed conveyor 10 and across a deadplate, indicated generally at 20, onto the upstream end of a lehr conveyor 22. The pusher bar 14 is preferably of sufficient length so as to accommodate enough articles to occupy the full width of the lehr belt 22 when the articles are so moved, and the mechanism to be described is adapted to move the pusher bar 14 in a cyclical fashion for moving groups of articles as they are fed thereto on the infeed conveyor 10. As shown in FIG. 2, the infeed conveyor 10 is of conventional construction, as is the deadplate 20 located adjacent the side or edge 18 of the conveyor 10. The lehr conveyor 22 used to advance the articles row on row through the lehr is also of conventional construction and need not be described in detail herein.

The means for cyclically moving the pusher bar first across the infeed conveyor 10 and thence across the deadplate 20 not only moves the pusher bar forwardly to push the articles from their positions on the infeed conveyor onto the lehr conveyor, but also serves to retract the pusher bar slightly, to the position indicated generally in phantom lines in FIG. 1, at which time the pusher bar is raised vertically upwardly to clear the articles advancing on the infeed conveyor and thence again drops downwardly to return to the initial full line position shown in FIG. 2. A fixed frame 24 is provided at the opposite side of the infeed conveyor from the lehr conveyor for supporting the mechanism for so moving the pusher bar. The fixed frame 24 includes four adjustable posts 26, 26 and these posts support a pair of horizontally extending members 28, 28 which carry a pair of side plates 30, 30 one of which is shown in FIG. 2. A horizontally extending shelf 32 is provided adjacent the horizontally extending support 28 and carries a drive motor 34 which is drivingly connected to a brake and clutch unit 44. The output shaft 36 of the brake and clutch unit 44 carries a variable pitch sheave 38 on which is entrained a drive belt 40. An idler module 45 has a shaft which carries a sheave 42 driven by the drive belt 40 and a timing belt sprocket 46. A timing belt 48 is entrained over the sprocket 46 and over a sprocket 50 associated with a speed reducing unit 52. One output shaft 54 of the speed reducing unit carries a rotary cam 56 on one side of the unit as best shown in FIG. 3, and a second output shaft 58 on the opposite side carries three camming devices 60, 62 and 64 for sequentially operating portions of the apparatus for moving the pusher bar 14 to be described hereinbelow.

The upper end or top portion of the fixed frame 24 defines guide means for slidably supporting a carriage unit 70, which carriage unit has a rear portion which is pivotally supported as shown at 71 on the upper end of a vertically extending lever 72. The carriage 70 includes a forward portion, indicated generally at 74 which is supported on a pair of rollers 76, 76 rotatably mounted in brackets 78, 78 comprising a portion of the fixed frame 24. The lever 72 is pivotally supported at its lower end in the fixed frame of the machine on a rock shaft 80 for movement between the initial or retracted position shown in full lines, and the forward position shown in phantom lines, as a result of rotation of the rotary cam 56 in the direction of the arrow 82. A cam follower 84 is provided intermediate the lower and upper ends of the lever 72 for engagement with the surface of the rotary cam 56. Biasing means is provided for maintaining the cam follower 84 in engagement with the rotary cam 56, and preferably said means comprises an air spring indicated generally at 86. The air spring combined with an accumulator 87 serve to exert a substantially constant force on the lever 72 regardless of the location of the lever during its movement between the positions shown. In this respect, the air spring has been found to be more satisfactory than a conventional coil spring, which exerts a force dependent on its displacement.

FIG. 3 shows the fixed frame 24 from the back, with the infeed conveyor 10 extending across in front of said fixed frame, and also showing the pusher bar 14 pendulously supported on a pair of pivotally mounted parallel crank arms 90 and 92. The forward end of the slidably supported carriage 70 includes a pair of outwardly extending supports, indicated generally at 74, 74 each of which rotatably support one of the depending crank arms 90 and 92. These supports, one of which is located on the upstream and one on the downstream side of the carriage 70, slidably receive a cross-slide 95, which cross-slide includes rack gear defining portions 94 and 96 which mesh with spur gears 98 and 100 respectively provided on a pair of rock shafts each of which carries one of the crank arms 90 and 92 respectively. Thus, the arms are pendulously supported for pivotal movement between the full line position and the phantom line positions shown in response to reciprocable movement of the cross-slide in an upstream and downstream direction with respect to the direction of movement of the articles on the infeed conveyor. The pusher bar 14 is supported at the lower ends of the crank arms 90 and 92 and moves parallel to this direction associated with said infeed conveyor.

The slidable carriage 70 is restrained for movement perpendicular to the above direction in a generally horizontal plane. A cam follower roller 102 is rotatably mounted in a bracket provided on the upstream support member 74 on the carriage. This roller in cooperation with a second movable cam follower roller 104 set on opposite faces of a relatively fixed cam 106 provided in the fixed frame of the apparatus cantilever fashion from a support bracket indicated generally at 108 in FIG. 1. Actually, the "fixed" cam 106 is pivotally mounted on a stub shaft in a journal bearing provided in the support block 108 in order to provide a convenient means for allowing this "fixed" cam to ride up and down slightly with the carriage 70 as the latter moves under the influence of the lever 72 on the rollers 76, 76 described hereinabove. However, the cam 106 may be regarded, in the plan view at least, as being fixed with respect to the frame 24.

The "fixed" cam 106 includes a linear cam surface as its left-hand side as viewed in FIG. 1, and includes an arcuately shaped surface 107 for engagement with the movable cam follower roller 104 to cause the latter to follow the path indicated generally by the series of arrows shown at 105. The cam follower roller 104 is mounted on the cross slide 95, and a fluid motor 110 mounted on the carriage 70 has a movable piston portion 114 connected to the cross slide 95 by a bracket 116 and actuating rod 118 so as to exert a biasing force on the cam follower roller 104 to urge it in engagement with the cam surface 107 of the fixed cam 106. The fluid motor 110 has a first chamber 111 communicating with a source of fluid under pressure 112 when a spool valve 120 is in the position shown in FIG. 1. As so constructed and arranged, it will be apparent that as the carriage 70 is moved from the solid line position shown in FIGS. 1 and 2, the cross-slide 95, and more particularly the rack gear defining end portions 94 and 96 thereof will be given a component of velocity opposite to the direction of movement 12 of the articles of the infeed conveyor, and through the spur gears 98 and 100 will move the parallel arms 90 and 92 from the solid line position at one side of bottom dead center to the phantom line position shown at the other side of their bottom dead center positions. The arcuate surface 107 of the "fixed" cam 106 is so shaped as to impart to the lower ends of the parallel arms 90 and 92 and hence to the pusher bar 14 a predetermined path 16 as best shown in FIG. 1, wherein the pusher bar moves diagonally with a relatively small forward component of velocity into engagement with the articles to be transferred, and then smoothly accelerates the articles in this direction until the articles are brought to positions adjacent the edge of said infeed conveyor.

During return movement of the carriage 70, under the influence of the rotary cam 56 mentioned above, the cam follower roller 104 is maintained in contact with the "fixed" cam 106 for an initial portion of the return movement of the pusher bar 14 as suggested in FIG. 1 by the intermediate position shown generally at 14a, so as to cause the articles on the lehr conveyor to be cleared prior to raising of the pusher bar in the manner to be described. When this intermediate position has been reached by the pusher bar 14 a camming device 60 provided for this purpose on the output shaft 58 of the speed reducing unit 52 slides the spool valve 120 to its alternate position allowing air under pressure to reach the opposite side of the piston from that utilized in the air spring function of the fluid motor 110 extending the actuating rod 118 and sliding the cross-slide in the opposite direction to move the cam follower 104 out of contact with the fixed cam 106 as suggested by the series of arrows in FIG. 1. Thus, during return movement of the lever 72 from the phantom line position shown in FIG. 2 to the full line position shown, the cam follower 104 and hence the rack defining portions 94 and 96 of the cross-slide 95 will be moved from the full line position shown in FIG. 3 to a position wherein the crank arms are rotated through their initial positions, indicated generally at 90a and 92a, to stored disengaged positions as indicated generally at 90b and 92b to allow the pusher bar 14 to clear articles on the infeed conveyor to be transferred upon the next cycle of operation of the apparatus.

A camming device 62 also located on the output shaft 58 of the speed reducing unit 52, will be actuated at a somewhat later instant of time during the cycle of operation of the apparatus to return the spool 120 to its initial position allowing the cam follower 104 and its associated cross-slide 95 and rack gear defining end portions 94 and 96 to return to their initial position shown in FIG. 1.

Thus, during movement of the carriage 70 from a position where the pusher bar is located over the lehr conveyor, to the solid line position shown in FIG. 1, the pusher bar follows a substantially straight line lateral course above the path of movement of the articles on the infeed conveyor. It will be apparent that the design adopted herein for so moving the pusher bar allows considerable leeway and returning the pusher bar from its extended position over the lehr conveyor to its position in front of the edge portion of the infeed conveyor 10. For example, the pusher bar 14 can be returned initially in its lowered position adjacent the surface of the lehr conveyor as described hereinabove in order to clear articles on the lehr conveyor prior to being raised for return movement across the infeed conveyor 10.

The pendulously supported pusher bar adopted herein is responsible for the versatility in providing for a predetermined path of the pusher bar, particularly during its forward movement. However, as a result of the pendulous fashion in which the pusher bar 14 is supported on the lower end portions of the parallel arms 90 and 92, it will be apparent that means must be provided for restraining the pusher bar to horizontal movement parallel to the surface of the infeed and lehr conveyors at least during this forward movement of the carriage 70. More particularly, although the pusher bar might be expected to move downwardly toward the infeed conveyor and then upwardly away therefrom as the crank arms are moved from the positions shown at 90 and 92, through their bottom dead center positions, to the positions indicated at 90a and 92a in FIG. 3, this pendulous motion is offset by providing for a slight vertical motion of the parallel arms 90 and 92. The forward end portion 74 of the carriage 70 is supported on rollers 76, 76 as mentioned above. These rollers engage a non-linear track defined by cam surfaces 75, 75 on the carriage 70 which impart a slight vertical up and down movement to the carriage 70 as it moves forwardly from the position shown in full lines to the position shown in phantom lines. More particularly, as the carriage begins its cyclical movement, the cams 75, 75 will cause the forward end of the carriage, particularly the cross-slide supporting portion, indicated generally at 74, to be raised slightly compensating for a tendency for the parallel crank arms to move the pusher bar downwardly toward the infeed conveyor 10. So too, as the arms swing past bottom dead center, the cams 75, 75 will cause the carriage portion 74 to be lowered slightly. The result will be a horizontal motion of the pusher bar 14 in parallel spaced relationship above the infeed conveyor in following the diagonal path outlined above without any relative movement vertically between the pusher bar 14 and the articles being transferred.

Finally, a camming device 64 is provided on the output shaft 58 of the speed reducing unit 52 in order to stop operation of the apparatus described herein. A signal derived from a glassware forming machine (not shown) sequentially operates the apparatus. More particularly, the apparatus described herein will be initiated in a cyclical fashion to conform to the speed of operation of the glassware forming machine.

We claim:

1. Article handling apparatus comprising an infeed conveyor for advancing the articles single file in a first direction, a lehr conveyor oriented normally with respect to the infeed conveyor, a deadplate adjacent one side of said infeed conveyor and located at the upstream end of said lehr conveyor, and cyclically operable means for transferring groups of articles from said infeed conveyor across said deadplate onto said lehr conveyor, said article transfer means including a fixed frame on the opposite side of said infeed conveyor, an article engaging pusher bar, a carriage movably mounted on said frame for reciprocating movement generally toward and away from the upstream end of said lehr conveyor, means for so moving said carriage, said carriage having a cross-slide thereon reciprocable in a direction parallel said first direction, means for reciprocating said cross-slide in timed relationship with reciprocation of said carriage, a pair of depending crank arms pivotally supported in said carriage and oscillatable in response to said reciprocating movement of said cross-slide, said pusher bar being pivotally supported on the free ends of said crank arms so that it moves parallel to said first direction in response to reciprocating movement of said cross-slide, said means for so moving said cross-slide and said carriage being so timed with respect to one another that the pusher bar moves initially diagonally toward a group of articles on said infeed conveyor to engage them and move the articles diagonally across said infeed conveyor, said pusher bar then moving laterally across said deadplate to push the group of articles across the deadplate and onto the lehr conveyor.

2. The combination defined in claim 1 wherein said means for reciprocably moving said carriage includes a lever pivotally mounted in the machine frame, a rotary cam for moving the lever in one direction, biasing means for urging the lever in the opposite direction, and means connecting the free end of said lever to said carriage.

3. The combination defined in claim 1 wherein said means for reciprocating said cross-slide in timed relationship with movement of said carriage comprises a fixed cam mounted in said frame, a cam follower on said cross-slide, and biasing means for urging said cam follower into contact with said fixed cam.

4. The combination defined in claim 3 wherein said cross-slide includes rack gear portions adjacent the pivoted upper ends of said crank arms, spur gears meshing with said rack gear portions and oscillatable in response to movement of said rack gear to oscillate said crank arms in unison.

5. The combination defined in claim 3 wherein said means for reciprocably moving said carriage includes a lever pivotally mounted in the machine frame, a rotary cam for moving the lever in one direction, biasing means for urging the lever in the opposite direction, and means connecting the free end of said lever to said carriage.

6. The combination defined in claim 5 wherein said means connecting the free end of said lever to said carriage comprises a pivoted joint adjacent one end of said carriage, said fixed frame defining guide means for slidably supporting the other end of said carriage, said guide means comprising a pair of spaced cam tracks and rollers for imparting slight vertical motion to said cross arms and said pusher bar so that the latter moves parallel to the surface of said infeed conveyor and said deadplate during its initial diagonal movement and subsequent lateral movement thereacross.

7. The combination defined in claim 6 wherein said lever moving in a vertical plane and is pivotally supported adjacent its lower end in said fixed frame, said pivoted joint being provided at its upper end, and which lever carries a cam follower intermediate its upper and lower ends for engagement with said rotary cam.

8. The combination defined in claim 7 wherein said rotary cam and said fixed cam are so shaped that said carriage and said cross-slide move said pusher bar inwardly after crossing said deadplate in said lateral direction across an upstream portion of said lehr conveyor and then return in the opposite lateral direction prior to further oscillation of said crank arms.

9. The combination defined in claim 8 wherein said biasing means for said cross-slide comprises a fluid operable cylinder and piston which cooperates to define a first chamber, said first chamber being selectively communicable with a source of fluid pressure to urge said cam follower on said cross-slide toward said fixed cam, said fluid cylinder and piston defining a second chamber opposite the first, and said second chamber being selectively communicable with a source of fluid pressure to permit movement of said cam follower away from said fixed cam to rotate said crank arms through substantial angles raising said pusher bar for return movement of said carriage to clear the next group of articles being advanced on said infeed conveyor.

10. The combination defined in claim 9 further characterized by control means for said fluid operable pusher bar raising means to sequentially move said cam follower away from said fixed cam and to return said cam follower to its active position for following said fixed cam during the next forward movement of said carriage.

11. Article handling apparatus comprising one conveyor for moving the articles in one direction, and a lehr conveyor oriented normally to said one conveyor, a fixed frame adjacent said one conveyor and opposite said lehr conveyor, a carriage movably mounted on said frame for reciprocating movement toward and away from said lehr conveyor, a cross-slide on said carriage and movable at right angles to the direction of said carriage movement, a pair of depending crank arms pivotally supported in said carriage for oscillatory motion in response to movement of said cross-slide, an article engaging bar pivotally supported on the depending free ends of said crank arms so that said bar moves parallel to the direction of movement of said one conveyor, means for moving said carriage, and means for moving said cross-slide in timed relationship with respect to said carriage movement so that said bar moves generally diagonally across said one conveyor.

12. The combination defined in claim 11 wherein said cross-slide moving means further includes a fixed cam mounted in said frame, a cam follower on said cross-slide, and biasing means for urging said cam follower into contact with said fixed cam for controlling said bar when the bar is in engagement with the articles.

13. The combination defined in claim 12 wherein said cross-slide comprises rack gear portions adjacent the pivoted upper ends of said crank arms, spur gears meshing with said rack gear portions and oscillatable in response to movement of said rack gear portions to oscillate said crank arms in unison.

14. The combination defined in claim 13 wherein said biasing means comprises a fluid motor having one part mounted on said carriage and a movable part connected to said cross-slide, and control means for said fluid motor to selectively pressurize one side of said movable part for said biasing function and the opposite side to move said cam follower away from said fixed cam to cause the bar to swing upwardly until it is clear of the articles on said conveyor for return movement prior to again engaging articles to move them generally diagonally as aforesaid.

15. The combination defined in claim 11 wherein said means for moving said carriage comprises a lever pivotally mounted in said machine frame, a rotary cam for moving the lever in one direction, biasing means for urging the lever in the opposite direction, and means connecting the free end of said lever to said carriage.

16. The combination defined in claim 14 wherein said means connecting the free end of said lever to said carriage comprises a pivoted joint adjacent one end of said carriage, guide means for slidably supporting the opposite end of said carriage and serving to impart slight vertical motion to said cross-slide and associated crank arms and article engaging bar.

17. The combination defined in claim 15 wherein said lever moves in a vertical plane and is pivotally supported at its lower end in said fixed frame, said pivoted joint being provided at the upper end of said lever, and a cam follower intermediate the upper and lower ends of said lever for engagement by said rotary cam.

18. The combination defined in claim 16 wherein said cross-slide moving means further includes a fixed cam mounted in said frame, a cam follower on said cross-slide, and biasing means for urging said cam follower into contact with said fixed cam for controlling said bar when the bar is in engagement with the articles.

19. The combination defined in claim 17 wherein said cross-slide comprises rack gear portions adjacent the pivoted upper ends of said crank arms, spur gears meshing with said rack gear portions and oscillatable in response to movement of said rack gear portions to oscillate said crank arms in unison.

20. The combination defined in claim 18 wherein said biasing means comprises a fluid motor having one part mounted on said carriage and a movable part connected to said cross-slide, and control means for said fluid motor to selectively pressurize one side of said movable part for said biasing function and the opposite side to move said cam follower away from said fixed cam to cause the bar to swing upwardly until it is clear of the articles on said conveyor for return movement prior to again engaging articles to move them generally diagonally as aforesaid.

* * * * *